United States Patent
Segrest et al.

(10) Patent No.: US 7,416,412 B2
(45) Date of Patent: Aug. 26, 2008

(54) FIREFIGHTER TRAINING APPARATUS

(76) Inventors: Roy R. Segrest, 3757 Aldergate Pl., Casselberry, FL (US) 32707; David T. Eaves, 4519 Lake Ashley Dr., Mt. Dora, FL (US) 32757

( * ) Notice: Subject to any disclaimer, the term of this patent is extended or adjusted under 35 U.S.C. 154(b) by 583 days.

(21) Appl. No.: 11/183,931

(22) Filed: Jul. 19, 2005

(65) Prior Publication Data
US 2007/0020594 A1    Jan. 25, 2007

(51) Int. Cl.
G09B 19/00    (2006.01)
(52) U.S. Cl. ............................................. 434/226
(58) Field of Classification Search ............... 434/219, 434/226, 247, 251, 256; 82/74; 473/445
See application file for complete search history.

(56) References Cited

U.S. PATENT DOCUMENTS

| | | | |
|---|---|---|---|
| 2,237,600 A * | 4/1941 | Gilman | 473/445 |
| 3,684,283 A * | 8/1972 | Forrest | 473/445 |
| 3,873,089 A * | 3/1975 | Krug | 473/445 |
| 4,526,548 A | 7/1985 | Livingston | |
| 4,688,792 A | 8/1987 | Rivkin | |
| 4,736,947 A * | 4/1988 | Jenkins | 473/445 |
| 4,802,670 A * | 2/1989 | Smith | 473/445 |
| 4,861,270 A | 8/1989 | Ernst et al. | |
| 5,203,707 A | 4/1993 | Musto et al. | |
| 5,275,571 A | 1/1994 | Musto et al. | |
| 5,316,484 A * | 5/1994 | Layton et al. | 434/226 |
| 5,385,523 A * | 1/1995 | Forrest | 473/445 |
| 5,447,437 A | 9/1995 | Joynt et al. | |
| 5,509,807 A * | 4/1996 | Joice et al. | 434/226 |
| 5,518,402 A | 5/1996 | Tommarello et al. | |
| 5,688,136 A | 11/1997 | Rogers et al. | |
| 5,823,784 A * | 10/1998 | Lane | 434/226 |
| 5,927,990 A | 7/1999 | Welch et al. | |
| 5,980,398 A * | 11/1999 | Shingleton | 473/445 |
| 6,077,081 A | 6/2000 | Dunn | |
| 6,129,552 A | 10/2000 | Deshoux et al. | |
| 6,612,971 B1 * | 9/2003 | Morris | 482/74 |
| 6,824,504 B2 | 11/2004 | Ott | |
| 6,866,513 B2 * | 3/2005 | Hough | 434/226 |
| 6,942,585 B1 * | 9/2005 | Krause | 473/445 |

* cited by examiner

*Primary Examiner*—Kurt Fernstrom
(74) *Attorney, Agent, or Firm*—William M. Hobby, III

(57) ABSTRACT

A firefighter training apparatus includes a sled base having a plurality of sled runners and an upright post attached to the base. The upright post is slidably attached to the base for adjusting the height of the post. A pole is attached to the post with a pole-to-post attaching mechanism which pole is movable against a resistance force so that pushing the pole against the resistance force provides an exercise routine for a firefighter simulating the breaching of a ceiling. The sled base has a section of firefighter's hose attached thereto which can be grasped by the firefighter for pulling the firefighting training apparatus to simulate the pulling of a fire hose. The base also has removably attachable weights for increasing or decreasing a load pulled by the firefighter. A pair of straps is attached to the sled base for a firefighter to pull to simulate removing of victims from a hazardous environment.

12 Claims, 4 Drawing Sheets

FIREFIGHTER TRAINING APPARATUS

BACKGROUND OF THE INVENTION

A firefighter fitness and training apparatus allows a firefighter to simulate pulling of a fire hose and of breaching of a ceiling during a fire and the removing of victims from a hazardous environment.

It is important for firefighters to develop reflexes and muscles to perform the functions that they are commonly called upon to perform during fire and rescue operations. The use of exercise and training machines is very useful in developing such reflexes and muscles and for keeping the firefighters in shape for the specific functions that they are required to be performed. Typical functions that a firefighter may be called upon to do is to drag large sections of fire hose from a fire truck to a fire hydrant or to a better location for the application of water from the fire hydrant. Another common technique for firefighters is the breaching of ceilings in which pike poles or the like are required to be shoved up into ceilings for breaching the ceiling. The firefighters also have to be in condition for removing victims from a hazardous environment. This is commonly done by grasping the victim and dragging him from a hazardous to a safer environment. It is thus desirable to have a firefighter's training equipment in the nature of a fire sled which can provide training in the pulling of a fire hose and in the grasping and dragging of a victim to remove the victim from a hazardous environment as well as simulated training in the breaching of a ceiling in an area where a fire may be in the ceiling.

Prior art patents that may provide useful training for firefighters can be seen in the Rivkin U.S. Pat. No. 4,688,792 for a training and exercise machine for football and wrestling and which can also be used for training firefighters in the development of rapid dynamic reflexes. This patent provides a dummy mounted to a crossbeam. In the Livingston U.S. Pat. No. 4,526,548, a mobile firefighting training trailer is provided having a plurality of rooms and passages with simulated appliances and furniture and having a smoke generator and flame generating devices positioned for simulating fires in a house. In the Ernst et al. U.S. Pat. No. 4,861,270, a firefighting trailer is also provided for training firefighters. In the Tommarello et al. U.S. Pat. No. 5,518,402, a firefighter trainer is provided having personal tracking and constructive entry determination training and trains firefighters to extinguish simulated fire scenarios. In the Musto et al. U.S. Pat. No. 5,203,707, a modular firefighter trainer is provided for use for training firefighters while the Musto et al. U.S. Pat. No. 5,275,571 is a portable fire trainer for use in training by an instructor of company employees in the use of fire extinguishers for extinguishing Class A, B or C fires. In the Joynt et al. U.S. Pat. No. 5,447,437, a portable firefighter training system for fire extinguishing training is provided for educating people in the proper use of firefighting procedures. In the Ott U.S. Pat. No. 6,824,504, a full body, adjustable weight sled exerciser is provided for training football players in tackling or blocking practice. The Rogers et al. U.S. Pat. No. 5,688,136 is a firefighter trainer for use in training firefighters on passenger rescue during aircraft simulated cabin fire and during simulated oil spill module fires. The Welch et al. U.S. Pat. No. 5,927,990 is a firefighter trainer for simulating flashover phenomena and teaches the trainee how to recognize warning signs of flashovers and what follows the warning signs and what to do if confronted with the warning signs. The Dunn U.S. Pat. No. 6,077,081 is a firefighting training method and apparatus for simulating the pumping of water through various long lengths of hose to train firefighters to deliver a proper amount of water through the fire hose. The Deshoux et al. U.S. Pat. No. 6,129,552 is a teaching installation for learning and practicing the use of firefighting equipment, such as fire extinguishers.

The present invention is directed towards a firefighter training and exercising apparatus which has a fire sled equipped for training a firefighter in the pulling of a fire hose and in the breaching of a ceiling and in the removing of a victim from a hazardous environment.

SUMMARY OF THE INVENTION

A firefighter training apparatus includes a sled base having a plurality of sled runners and an upright post attached to the base. The upright post is slidably attached to the base for adjusting the height of the post. A pole is attached to the post with a pole-to-post attaching mechanism which pole is movable against a resistance force so that pushing the pole against the resistance force provides an exercise routine for a firefighter simulating the breaching of a ceiling. The sled base has a section of firefighter's hose attached thereto which can be grasped by the firefighter for pulling the firefighting training apparatus to simulate the pulling of a fire hose. The base also has removably attachable weights for increasing or decreasing a load pulled by the firefighter. A pair of straps is attached to the sled base for a firefighter to pull to simulate removing of victims from a hazardous environment.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
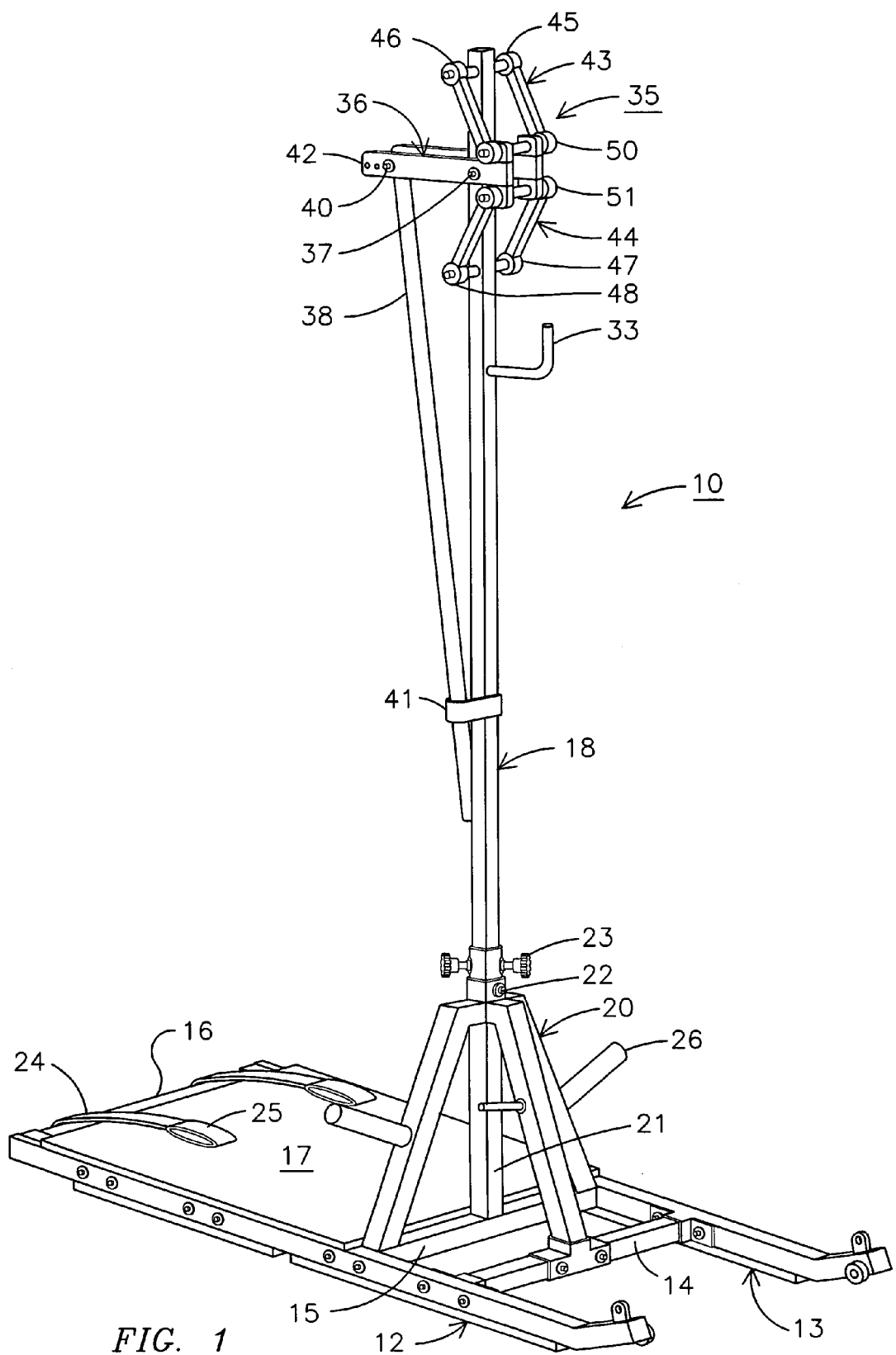
FIG. 1 is a perspective view of a firefighter training apparatus in accordance with the present invention without the weights and section of firefighter's hose.

Referring to the drawings, FIGS. 1-5, a firefighter training apparatus 10 is illustrated having a base 11 having a pair of sled runners 12 and 13 thereon connected with a plurality of cross frame members 14, 15 and 16 and having a floor 17. The firefighting apparatus has a vertically extending or upright pole 18 which is supported by a tripod arrangement of legs 20 and having a hollow upright frame member 21 fixedly attached to the cross frame member 15 at one end and supported by the tripod legs 20 at the other end. The vertically extended post 18 telescopes into and out of the tube 21 and has a locking pop pin 22 and a pair of threaded tightening knobs 23. The posts 18 can be adjusted vertically by sliding within the supporting tube 21 and locking in place with the pop pin 22 and threaded tightening knobs or bolts 23. The sled base 11 has a pair of straps 24, each having a looped handle 25 thereon and attached to the cross member 16. The straps are used to pull the training apparatus 10 to practice removing a victim from a hazardous environment. The tripod legs 20 have a pair of weight supporting posts 26 attached thereto at an angle for sliding dead weights 27 onto and off and holding the dead weights to the fire training apparatus 10 to increase the weight of the firefighting apparatus.

Figure 2:
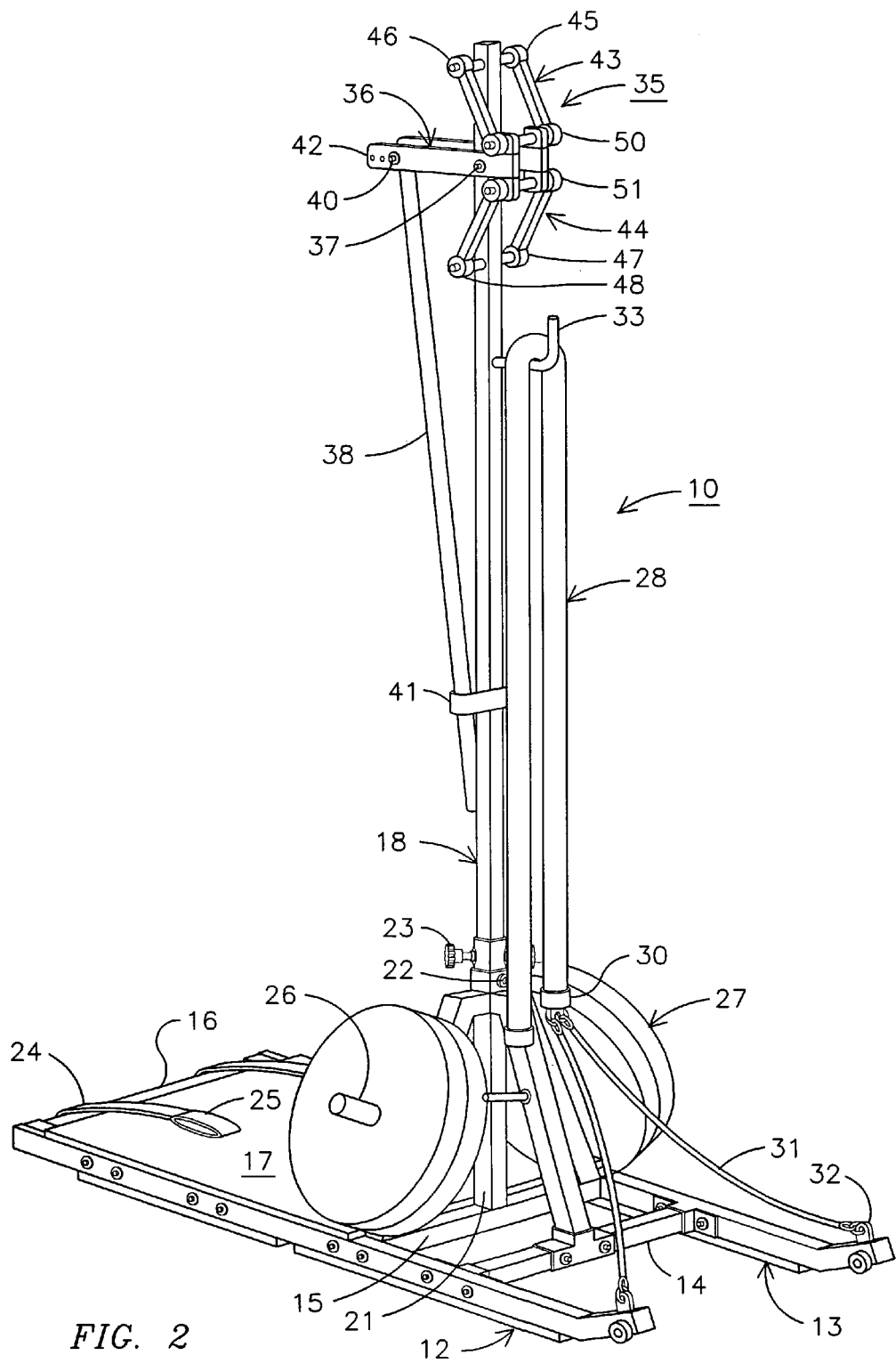
FIG. 2 is a perspective view of the firefighter training apparatus of FIG. 1 having added weights and a section of firefighter's hose.
Figure 3:
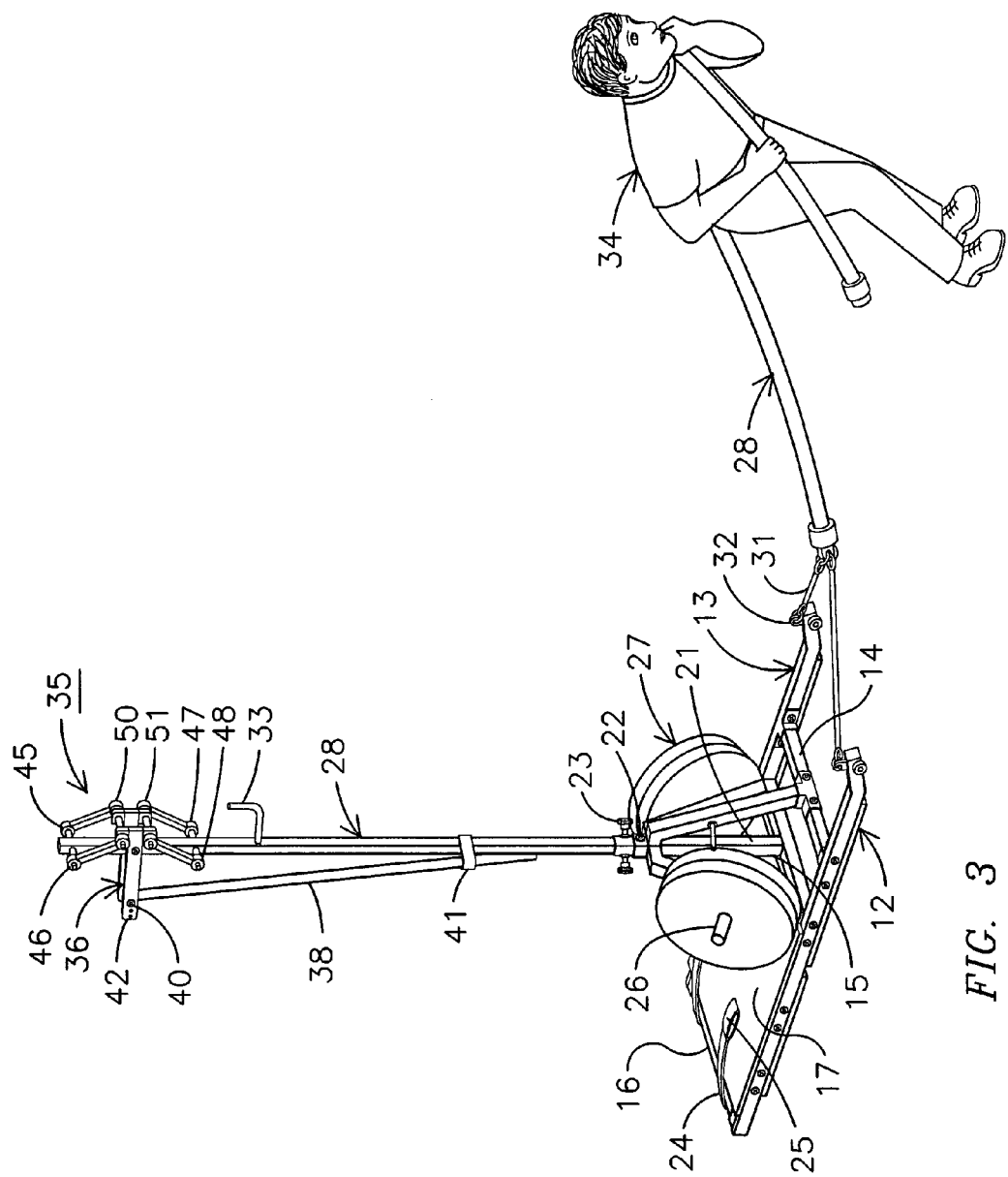
FIG. 3 is a perspective view of the firefighter training apparatus of FIGS. 1 and 2 having a firefighter practicing pulling of a fire hose.

As seen in FIGS. 2 and 3, a section of fire hose 28 has an end collar 30 thereon for attaching a pair of cords 31 which are also attached to an eye connector 32 on each sled runner 12 and 13. The fire hose 28, as seen in FIG. 2, is wrapped around an L-bracket 33 attached to the upright posts 18. The hose 28 is looped around the bracket 30 for storage and is removed for training, as shown in FIG. 3, so that a firefighter 34 can loop the hose 28 over his shoulder for pulling the entire fire sled training apparatus 10 on the sled runners 12 and 13.

Figure 5:
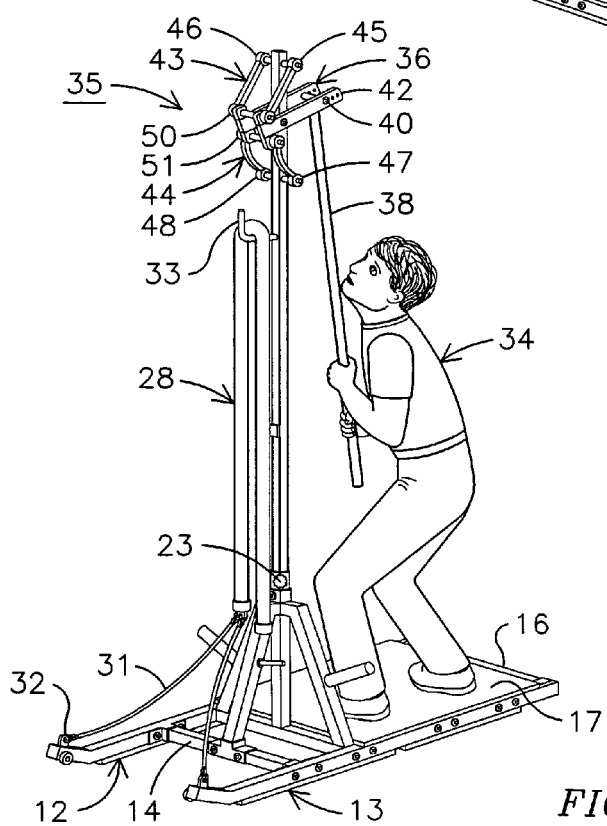
FIG. 5 is a perspective view of the firefighter training apparatus of FIGS. 1-4 having a firefighter practicing breaching of a ceiling.

The post 18 has a post pole connector 35 attached to the top end thereof which includes a pair of lever arms 36 pinned at 37 to the post 18 and extending to either side of the post 18. The lever arms 36 are attached to a pole 38 which are pinned at 40 to the lever arms 36 and may be strapped with a strap 41 to the post 18, as seen in FIG. 2, when the pole 38 is not in use. A plurality of additional holes 42 allow the pole 38 to be pinned at different positions. The lever arms 36 are supported by a pair of upper arms 43 and a pair of lower arms 44. The upper arms 43 are mounted with a spring loaded rod 45 through an opening 46 in the post 18 while a pair of arms 44 are attached with a rod 47 through an opening 48 in the post 18 and is spring loaded to apply a pressure to the arms 34. The ends 50 and 51 of the arms 43 and 44 are both positioned against the other end of the lever arm 36 to apply a toggle force to both sides of the lever arm 36. The pole 38 is pushed upward or pulled against a resistance force applied from the arms 43 and 44 against the other side of the lever arms 36. This allows the firefighter 34 to practice the breaching of a ceiling, as seen in FIG. 5, by pushing the pole upwards or downwards against the pressure applied by the pole-to-post mechanism 35 spring loaded arms 43 and 44. The firefighter is standing on the platform 17 in FIG. 5.

Figure 4:
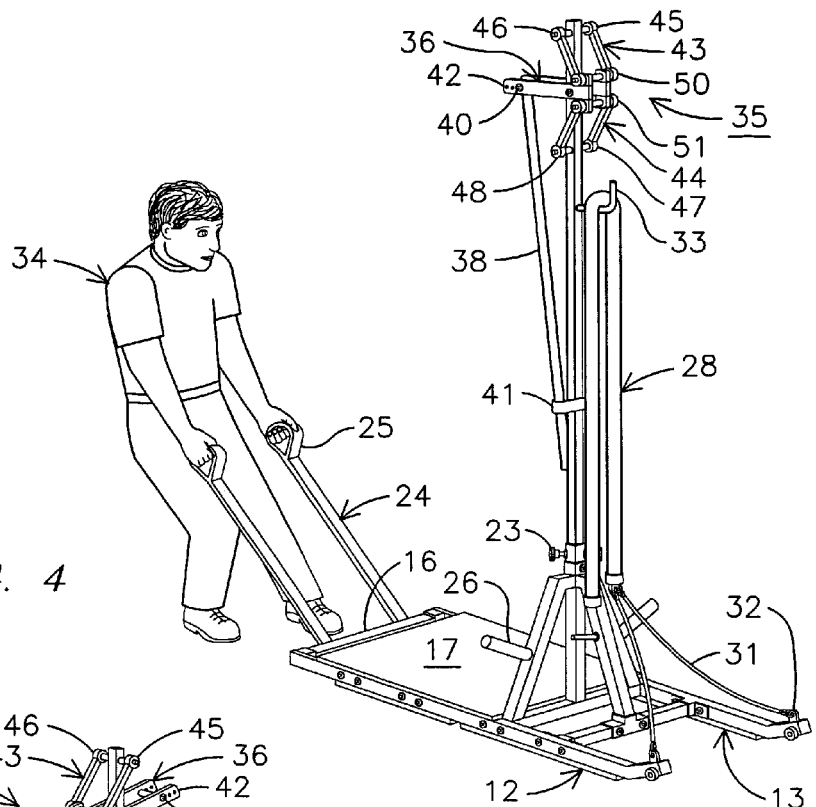
FIG. 4 is a perspective view of the firefighter training apparatus in accordance with FIG. 1-3 having a firefighter practicing the removing of a victim from a hazardous environment.

In FIG. 4 the firefighter can be seen grasping the straps 24 by the loops 25 and pulling the fire sled training apparatus 10 to simulate the removing of a victim from a hazardous environment and to exercise and train the appropriate muscles for this operation.

It should be clear at this time that a fire sled and fire training apparatus has been provided which advantageously allows the firefighter to both exercise and train in the use of common firefighter's duties including the pulling of a fire hose towards a fire hydrant or water source or towards a position for applying a pressurized water stream to a fire and also for training in the moving of victims from a hazardous environment and in the training of the breaching of a ceiling. However, the present invention should not be construed as limited to the forms shown which are to be considered illustrative rather than restrictive.

We claim:

1. A firefighter training apparatus comprising:

a base having at least one sled runner thereon;

at least one flexible pulling member attached to said base for gripping by a firefighter to pull said base;

an upright post having upper and lower portions, said lower portion being attached to said base;

a pole; and a pole to post attaching mechanism movably attaching said pole to said upright post upper portion, said pole to post attaching mechanism providing a resistance force to said pole whereby pushing on said pole against said resistance force provides an exercise routine for a firefighter;

whereby a firefighter training apparatus trains a firefighter in pulling fire hoses and pushing to breach a ceiling.

2. The firefighter training apparatus in accordance with claim 1 in which said flexible pulling member is a section of firefighter's hose attached thereto for being pulled by a firefighter to pull said sled to thereby train a firefighter in the pulling of a fire hose.

3. The firefighter training apparatus in accordance with claim 2 in which said upright post has a hanging bracket for supporting said section of firefighter's hose when not in use.

4. The firefighter training apparatus in accordance with claim 2 in which said base has a pair of sled runners thereon.

5. The firefighter training apparatus in accordance with claim 4 in which said base has at least one weight attaching member thereon for removably attaching weights thereto.

6. The firefighter training apparatus in accordance with claim 5 including a plurality of weights removably attached to said base.

7. The firefighter training apparatus in accordance with claim 6 in which said base has a pair of weight attaching protruding rods thereon for removably attaching a plurality of said weights thereto.

8. The firefighter training apparatus in accordance with claim 6 in which said one flexible pulling member includes a pair of generally flat pulling members attached to said base.

9. The firefighter training apparatus in accordance with claim 8 in which said base includes a tripod support for said upright post.

10. The firefighter training apparatus in accordance with claim 9 in which said upright post is slidably adjustable in said tripod support.

11. The firefighter training apparatus in accordance with claim 10 in which said pole to post attaching mechanism includes a lever member having a pair of end portions and being pinned to said post between said end portions and having said pole attached to one said lever member end portion.

12. The firefighter training apparatus in accordance with claim 11 in which said pole to post attaching mechanism has a pair of force resistance arms attached to said post and leaning against said lever member other end portion applying a force against the movement of said lever member upon movement of said pole.

* * * * *